United States Patent
Sasaki

(10) Patent No.: US 7,292,374 B2
(45) Date of Patent: Nov. 6, 2007

(54) METHOD AND APPARATUS FOR IMAGE PROCESSING CAPABLE OF EFFICIENTLY PERFORMING A GRAY-SCALE CORRECTION

(75) Inventor: Eiichi Sasaki, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 343 days.

(21) Appl. No.: 10/812,964

(22) Filed: Mar. 31, 2004

(65) Prior Publication Data

US 2004/0190070 A1 Sep. 30, 2004

Related U.S. Application Data

(63) Continuation of application No. 09/459,638, filed on Dec. 13, 1999, now Pat. No. 6,804,031.

(30) Foreign Application Priority Data

| Dec. 11, 1998 | (JP) | ................................ 10-353223 |
| Feb. 5, 1999 | (JP) | ................................ 11-029210 |
| Sep. 22, 1999 | (JP) | ................................ 11-269096 |

(51) Int. Cl.
*H04N 1/407* (2006.01)
(52) U.S. Cl. .................... 358/3.21; 358/3.15
(58) Field of Classification Search ...... 358/3.21–3.22, 358/3.03–3.05, 1.9, 3.13–3.15; 382/254–259, 382/274
See application file for complete search history.

(56) References Cited

U.S. PATENT DOCUMENTS

| 5,999,273 | A | * | 12/1999 | Casey et al. | ................ 358/3.06 |
| 6,014,499 | A | * | 1/2000 | Sasaki | ........................ 358/1.9 |
| 6,026,184 | A | * | 2/2000 | Fukushima | ................. 382/199 |
| 6,486,973 | B1 | * | 11/2002 | Sasaki | ........................ 358/1.9 |

FOREIGN PATENT DOCUMENTS

| JP | 01-218173 | 8/1989 |
| JP | 09-051434 | 2/1997 |
| JP | 09-275489 | 10/1997 |
| JP | 10-075367 | 3/1998 |

* cited by examiner

*Primary Examiner*—Thomas D. Lee
*Assistant Examiner*—Stephen Brinich
(74) *Attorney, Agent, or Firm*—Oblon, Spivak, McClelland, Maier & Neustadt, P.C.

(57) ABSTRACT

A novel image forming apparatus which makes gray-scale by performing at least one of operations including a manipulation of a plurality of dots arranged in a form of matrix, a single-dot-based density adjustment, or a single-dot-based size adjustment, includes a dot status detector and a density adjuster. The dot status detector detects an occurrence in which a dot exists at a focus dot position and no dot exists at positions immediately adjacent to the focus dot position in the main scanning direction. The density adjuster adjusts a writing level of the dot at the focus dot position so as to make the gray-scale smooth when the dot status detector detects the occurrence.

6 Claims, 10 Drawing Sheets

| INPUT | OUTPUT |
|---:|---:|
| 0 | 0 |
| 1 | 77 |
| 2 | 78 |
| 3 | 81 |
| 4 | 83 |
| 5 | 87 |
| 6 | 92 |
| 7 | 98 |
| 8 | 105 |
| 9 | 114 |
| 10 | 126 |
| 11 | 142 |
| 12 | 161 |
| 13 | 185 |
| 14 | 216 |
| 15 | 255 |

| 1 | 1 | 1 | 1 |
|---|---|---|---|
| 1 | 1 | 1 | 1 |
| 1 | 1 | 1 | 1 |
| 1 | 1 | 1 | 1 |

*FIG. 12A*

| 34 | 13 | 19 | 28 |
|---|---|---|---|
| 37 | 1 | 7 | 43 |
| 22 | 25 | 31 | 16 |
| 10 | 46 | 40 | 4 |

*FIG. 13A*

| 19 | 9 | 12 | 16 |
|---|---|---|---|
| 21 | 3 | 6 | 24 |
| 13 | 15 | 18 | 10 |
| 7 | 25 | 22 | 4 |

*FIG. 12B*

| 35 | 14 | 20 | 29 |
|---|---|---|---|
| 38 | 2 | 8 | 44 |
| 23 | 26 | 32 | 17 |
| 11 | 47 | 41 | 5 |

*FIG. 13B*

| 42 | 32 | 35 | 39 |
|---|---|---|---|
| 44 | 26 | 29 | 47 |
| 36 | 38 | 41 | 33 |
| 30 | 48 | 45 | 27 |

*FIG. 12C*

| 36 | 15 | 21 | 30 |
|---|---|---|---|
| 39 | 3 | 9 | 45 |
| 24 | 27 | 33 | 18 |
| 12 | 48 | 42 | 6 |

*FIG. 13C*

| INPUT DATA | LD WRITING VALUE | |
|---|---|---|
| | 0~7 | 8 |
| 1 | 85 | 30 |
| 2 | 170 | 80 |
| 3 | 255 | 255 |

*FIG. 15*

METHOD AND APPARATUS FOR IMAGE PROCESSING CAPABLE OF EFFICIENTLY PERFORMING A GRAY-SCALE CORRECTION

CROSS-REFERENCE TO RELATED APPLICATIONS

The present application claims priority rights of and is based on subject matter described in Japanese patent applications respectively filed in the Japanese Patent Office as listed below, the entire contents of which are hereby incorporated by reference:

1. JPAP10-353223 filed on Dec. 11, 1998,
2. JPAP11-029210 filed on Feb. 5, 1999, and
3. JPAP11-269096 filed on Sep. 22, 1999.

BACKGROUND OF THE INVENTION

1. Field of the Invention

The present invention generally relates to a method and apparatus, and more particularly to a method and apparatus for image processing which is capable of performing a density adjustment with respect to an output data signal for optical writing in which gray-scale is performed by at least one of plural methods including a manipulation of a plurality of dots, a density adjustment on a single dot, and a size adjustment on a single dot.

2. Discussion of the Background

In an image forming apparatus, density of a pixel is generally adjusted with a manipulation of a plurality of dots arranged in a form of matrix, a single-dot-based density adjustment, or a single-dot-based size adjustment. Various image density adjusting methods using multiple-value dithering have been developed. One example is Japanese Laid-Open Patent Application No. 3-80768 (1991). In this example, density adjustment with dithering is first performed with respect to multiple-value input image data. Then, multiple-value dithering is performed on the adjusted input multiple-value image data. Finally, density correction according to a printer output characteristic is performed on the resultant multiple-value dither data. With this method, density adjustment on multiple-value input image data can suitably be made to a variety of printer characteristics.

However, the above-described method cannot reproduce an optimal dot in accordance with conditions of neighboring dot positions. That is, the above method will make an inferior reproduction with respect particularly to a highlight or line portion. Further, it performs the multiple-value dithering using a single gamma correction table. Therefore, the above method cannot produce an output data signal for image writing in which gray-scale is performed for various different density adjustment operations based on, for example, a manipulation of a plurality of dots, a density adjustment on a single dot, and a size adjustment on a single dot.

SUMMARY OF THE INVENTION

Accordingly, an object of the present invention is to provide a novel image forming apparatus which can optimally reproduce a dot with superior fidelity to produce an output data signal for image writing in which gray-scale is performed based on, for example, a manipulation of a plurality of dots, a density adjustment on a single dot, and a size adjustment on a single dot.

To achieve this and other objects, the present invention provides a novel image forming apparatus which makes gray-scale by performing at least one of operations including a manipulation of a plurality of dots arranged in a form of matrix, a single-dot-based density adjustment, or a single-dot-based size adjustment, includes a dot status detector and a density adjuster. The dot status detector detects an occurrence in which a dot exists at a focus dot position and no dot exists at positions immediately adjacent to the focus dot position in the main scanning direction. The density adjuster adjusts a writing level of the dot at the focus dot position so as to make the gray-scale smooth when the dot status detector detects the occurrence.

The above-mentioned image forming apparatus may further include a dot phase adjuster for slightly displacing a position of dot right from a center of dot when the dot status detector detects the occurrence and left from a center of dot during a time other than when the dot status detector detects the occurrence.

The present invention also provides an image forming apparatus which generates gray-scale data by performing at least one operation including a manipulation of a plurality of dots arranged in a form of matrix, a single-dot-based density adjustment, or a single-dot-based size adjustment in accordance with commands sent from an external host system, includes a writing level adjuster and a gray-scale processor. The writing level adjuster adjusts a writing level in accordance with at least one of a density and a size of dots at positions adjacent to a focus dot position. The gray-scale processor generates gray-scale data of a line relative to input data when the commands relate to a line forming operation and of an image relative to input data when the commands relate to an image forming operation.

The gray-scale processor may convert input data with a value of a lowest level among predetermined multiple levels when the input data has a value other than 0.

The above-mentioned image forming apparatus may further includes a surrounding data detector detecting data of dots at positions immediately adjacent to a focus dot position and a writing value changer changing writing values of the multiple levels in accordance with data detected by the surrounding data detector.

The gray-scale processor may perform a dispersive gray-scale operation for generating gray-scale data of a line relative to input data and an intensive gray-scale operation for generating gray-scale data of an image relative to input data.

The present invention also provides a method of image forming which makes gray-scale by performing at least one of operations including a manipulation of a plurality of dots arranged in a form of matrix, a single-dot-based density adjustment, or a single-dot-based size adjustment, includes the steps of detecting an occurrence in which a dot exists at a focus dot position and no dot exists at positions immediately adjacent to the focus dot position in the main scanning direction and adjusting a writing level of the dot at the focus dot position so as to make the gray-scale smooth when the detecting step detects the occurrence.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 12A–12C and 13A–13C are dither tables in use for lines and images in the printer controller shown in FIG. 9;

FIG. 15 is an example of a data correction table of the print engine shown in FIG. 9.

DESCRIPTION OF THE PREFERRED EMBODIMENTS

Figure 1:
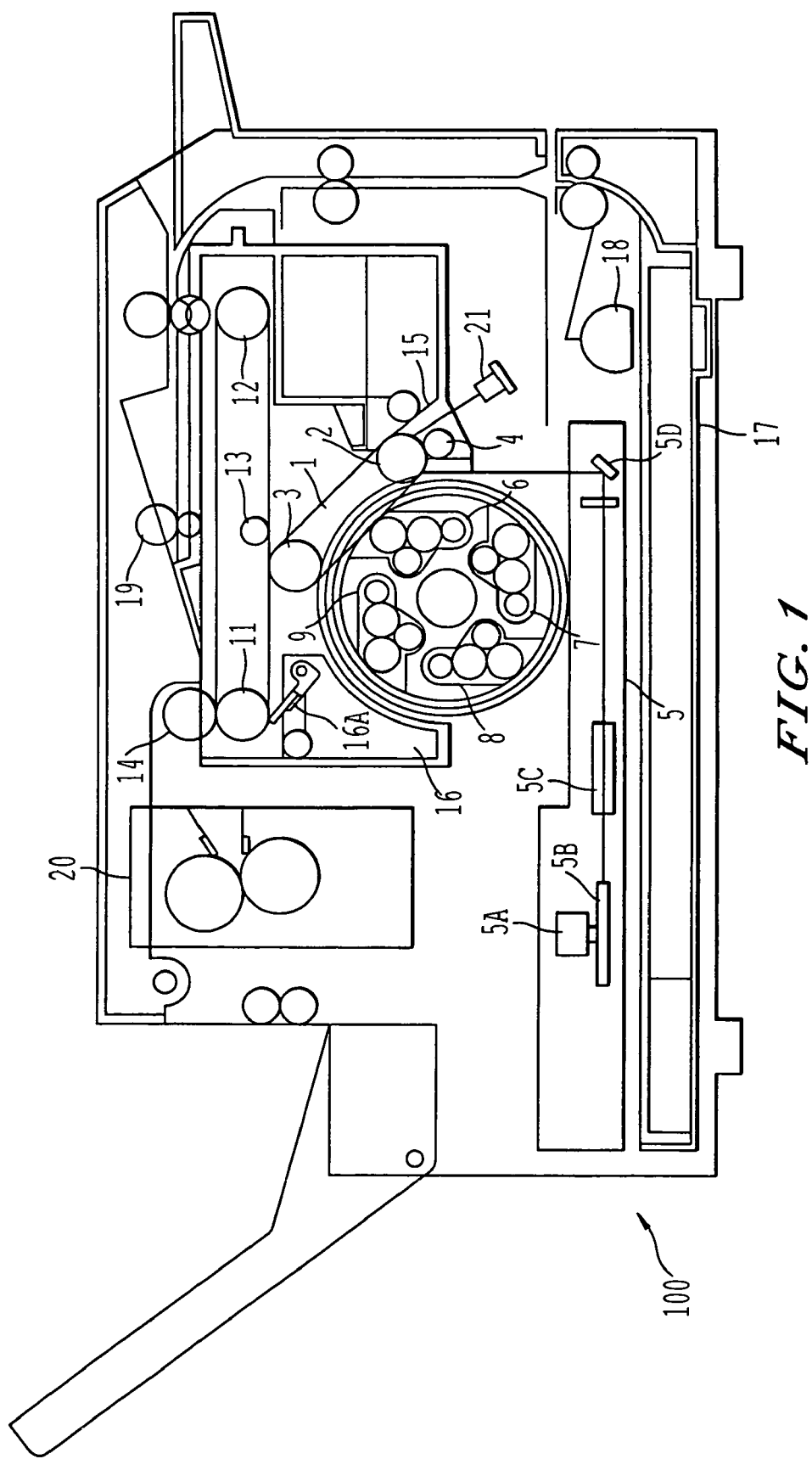
FIG. 1 is a schematic diagram of an exemplary image forming apparatus according to a first embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated an image forming apparatus 50 according to a first embodiment of the present invention. The image forming apparatus 50 of FIG. 1 includes a photoconductor 1, rollers 2 and 3, a charger 4, a laser writing unit 5, development units 6–9, an intermediate transfer belt 10, rollers 11 and 12, a bias roller 13, and a transfer roller 14. The image forming apparatus 50 further include cleaning units 15 and 16, a transfer sheet cassette 17, a sheet feed roller 18, a registration roller 19, a fixing unit 20, and a quenching lamp 21.

The photoconductor 1 for carrying an image thereon is made of a flexible and endless photoconductive belt and is extended with tension between the rollers 2 and 3 in order to be rotated therebetween clockwise. The photoconductor 1 is deposited at a center among various components including the quenching unit 21, the charger 4, the laser writing unit 5, the development units 6–9, the intermediate transfer unit 10, and the cleaning unit 15. The laser writing unit 5 is accommodated in a supporting enclosure having an exposure slit in the top surface thereof through which laser light passes to go out. Alternatively, an optical system having a light-producing component and a converging light transmission component in one unit may be used in place of the laser writing unit 5. The charger 4, the laser writing unit 5, and the cleaning unit 15 are positioned so as to be operative relative to the roller 2.

Each of the development units 6–9 contains one of yellow (Y), magenta (M), cyan (C), and black (Bk) developers, and includes a development sleeve which comes close to or contacts with the photoconductor 1 at a predetermined position so as to visualize a latent image formed on the photoconductor 1 with a non-contact development or a contact development. The intermediate transfer roller 10 for transferring and carrying the visualized image is extended with tension between the rollers 11 and 12 and is rotated counterclockwise.

The photoconductor 1 and the intermediate transfer roller 10 are made in contact with each other via the roller 3. Through this contact, the visualized image is transferred from the photoconductor 1 to the intermediate transfer belt 10 with the bias force of the bias roller 13. This operation is repeated for four times so that four visualized images of Y, M, C, and Bk are overlaid with precision on the intermediate transfer roller 10.

The transfer roller 14 is movable between positions in contact with and away from the intermediate transfer roller 10. The cleaning units 15 and 16 clean the photoconductor 1 and the intermediate transfer belt 10, respectively. The cleaning unit 16 includes a blade 16a which is kept at a position away from the intermediate transfer roller 10 during the image forming operation and is made in contact with pressure with the intermediate transfer roller 10 during the cleaning operation after the image forming operation. The cleaning unit 16 further includes a blade base 16b (FIG. 2) which supports the blade 16a and pivots around its supporting axis.

The laser writing unit 5 includes a laser diode (LD) unit, a polygon motor 5a, a polygon mirror 5b, an fθ lens 5c, and a reflection mirror 5d. The laser writing unit 5 emits a laser beam to form a latent image with dots on the photoconductor 1, and controls a gray scale of density by using a plurality of dots and an 8-bit density level of a dot, or a dot size, and a dot phase as left and right writing positions.

The processes of the image forming operation performed by the thus-configured image forming apparatus 50 are described below. In principle, an operation for forming a multiple color image is divided into four major processes: an original image is scanned with an image pickup device in a color image data input unit; data processing relative to the scanned data is performed in an image data processing unit; the resultant image data is temporarily stored in a memory; and the data thus stored in the memory is transferred to a color image output apparatus such as a printer so as to recorded on a recording sheet.

More specifically, when a color image signal sent from a separate image reading apparatus is input into the laser writing unit 5 of the image forming apparatus 50, the LD unit 14 in the laser writing unit 5 emits a laser beam which travels in a straight line and is then reflected by the polygon mirror 5b driven by the polygon motor 5a so as to perform a scanning operation. After the polygon mirror 5b, the scanning laser beam passes through the fθ lens 5c and is reflected by the reflection mirror 5d to fall on the surface of the photoconductor 1. Before this happens, the surface of the photoconductor 1 is discharged by the quenching lamp 21 and is evenly re-charged by the charger 4. Therefore, an electrostatic latent image is formed on the surface of the photoconductor 1 by the above-described scanning laser beam. In this operation, a full-color original image is separated into four mono-color image patterns of the Y, M, C, and Bk colors, and the scanning operation with the scanning beam is performed for each of the Y, M, C, and Bk mono-color image patterns.

The electrostatic latent images for the Y, M, C, and Bk mono-color separate image patterns are in turn developed with the respective development units 6–9 which are accommodated in a revolving enclosure. Each electrostatic latent image is thus visualized with the developer of the corresponding mono-color on the photoconductor 1. This mono-color image is then transferred onto the intermediate transfer belt 10 rotating counterclockwise in contact with the photoconductor 1. Such a transferring operation will be repeated for the Y, M, C, and Bk separate image patterns and, as a result, these separate image patterns are overlaid into one image on the intermediate transfer belt 10. The overlaid image is then transferred with the transfer roller 14 onto a transfer sheet which is picked up with the sheet feed roller from the transfer sheet cassette 17 and is forwarded to the transfer position in synchronism with the transfer operation by the registration roller 19. After the transfer operation, the transfer sheet is fed to the fixing unit 20 in which the overlaid image is fixed on the transfer sheet. As a result, a full-color image is formed on the transfer sheet.

Figure 2:
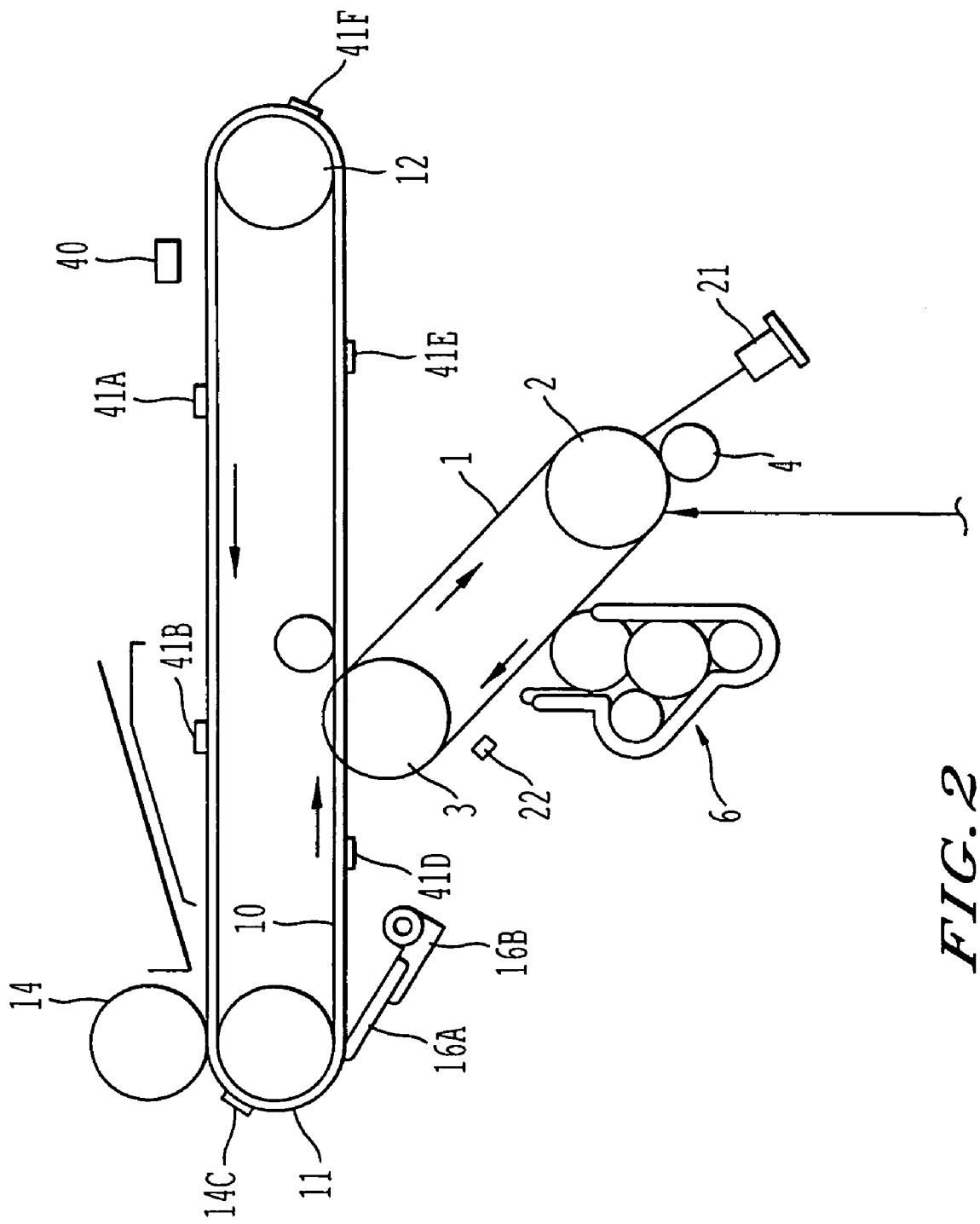
FIG. 2 is an illustration for explaining operations of a photoconductive member and an intermediate transfer member included in the image forming apparatus of FIG. 1.

As shown in FIG. 2, the image forming apparatus 50 further includes a mark detect sensor 40 mounted on a position close to the roller 12 above the intermediate transfer belt 10 and the intermediate transfer belt 10 is provided on its edge with six marks 41a–41f. The mark detect sensor 40 detects these six marks 41a–41f in turn as the intermediate transfer belt 10 rotates. A first mono-color image writing operation is caused to start when the mark detect sensor 40 detects any one of six marks 41a–41f, and when a first mono-color image writing operation starts with the detection of the mark 41a, for example, a second mono-color image writing operation starts with the next detection of the same mark 41a. In this case, signals of the mark detect sensor 40 for the detection of other marks 41b–41f cannot be used as timing signal for the writing operations and, therefore, these signals are masked by means of counting the number of mark detection. In addition, the image forming apparatus 50 further includes a toner density detect sensor 22. The toner density detect sensor 22 detects density of toner deposited on the photoconductor 1 and is mounted on a position facing to the photoconductor 1 close to and slightly upstream from the roller 3.

Figure 3:
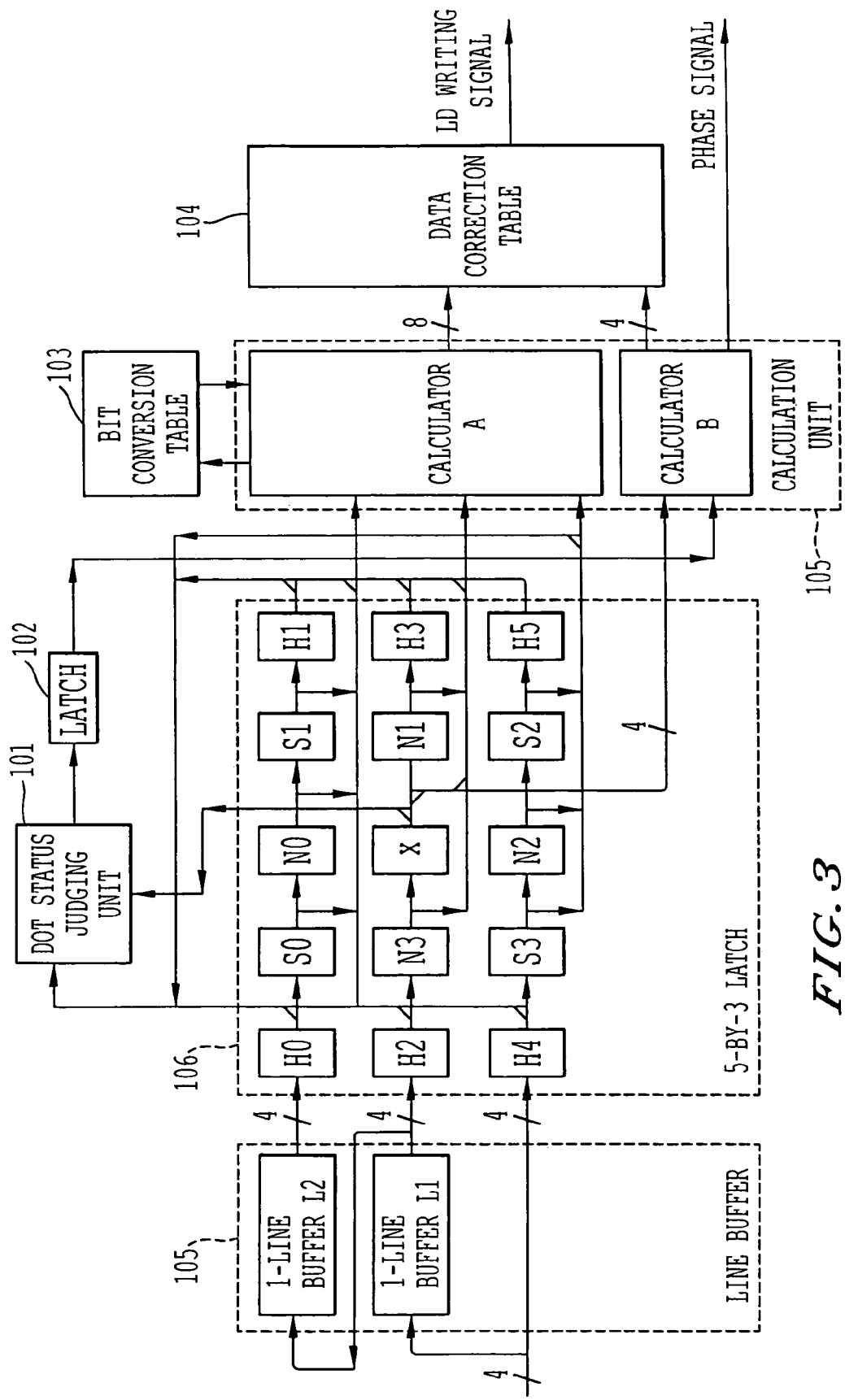
FIG. 3 is a block diagram of an image data processing controller included in the image forming apparatus of FIG. 1.

Referring to FIG. 3, an example of an image data processing controller 100 included in the image forming apparatus 50 is explained. The image data processing controller 100 of FIG. 3 includes a dot status judging unit 101, a latch 102, a bit conversion table 103, a data correction table 104, a line buffer 105, a 5-by-3 latch 106, and a calculation unit 107. The line buffer 105 includes one-line buffers L1 and L2. The 5-by-3 latch 106 includes 15 latches of H0–H5, S0–S3, N0–N3, and x arranged in a manner as shown in FIG. 3. The calculation unit 107 includes calculators A and B.

In FIG. 3, dither-processed 4-bit image data, for example, is latched with the latch H4 and is sent to the one-line buffer L2 through the one-line buffer L1. At this moment, the latch H2 latches image data immediately above the image data latched at the latch H4 from the one-line buffer L1 and the latch H0 latches image data immediately above the image data latched at the latch H2 from the one-line buffer L2. The image data latched at the latches H0, H2, and H4 are shifted to the latches S0, N3, and S3, respectively, in synchronism with a timing signal. In a similar manner, the image data are further shifted to the latches N0, x, and N2, to the latches S1, N1, and S2, and to the latches H1, H3, and H5. When the above-mentioned operations are performed, those 5-by-3 latches hold the 4-bit image data having 5 dots in the main scanning direction and 3 dots in the sub-scanning direction. The latches are arranged in the following manner.

H0, S0, N0, S1, H1
H2, N3, x, N1, H3
H4, S3, N2, S2, H5

In the description below, the references of the latches are also used as references for identifying a position and a density of a specific dot. Among the 5-by-3 dots shown in the above arrangement, six dots H0–H5 are each located two dots away from a center dot in each line, four dots S0–S3 are each located at a position diagonally opposite to a center dot x, and four dots N0–N3 are each located at a position immediately next to the center x in the vertical and horizontal directions.

The dot status judging unit 101 stores data indicating positions of the following dots except for the dots with the marks of xx, H0, S0, xx, S1, H1
H2, N3, xx, N1, H3
H4, S3, xx, S2, H5

Actually, when the 4-bit data (variable from 0 to 15) of these twelve dots of dots H0–H5, S0–S3, and N1 and N3 is 0, the dot status judging unit 101 sends judgement data 0 to the calculator B through the latch 102. In cases other than this, the dot status judging unit 101 sends judgement data 1 to the calculator B through the latch 102. In addition, the data indicating positions of the following dots except for the dots with the marks of xx is applied to the calculator A.

xx, S0, N0, S1, xx
xx, N3, x, N1, xx
xx, S3, N2, S2, xx

Figures 4, 5:
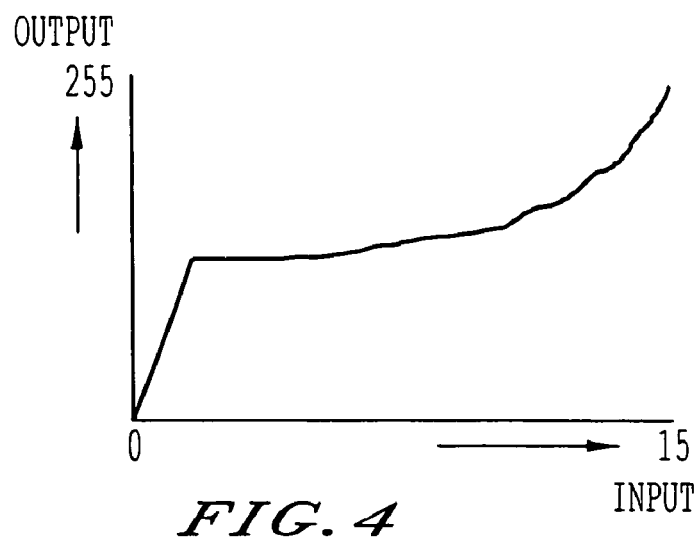
FIGS. 4 and 5 are a graph and a table for explaining a performance of a bit conversion table shown in FIG. 3.
Figure 6:
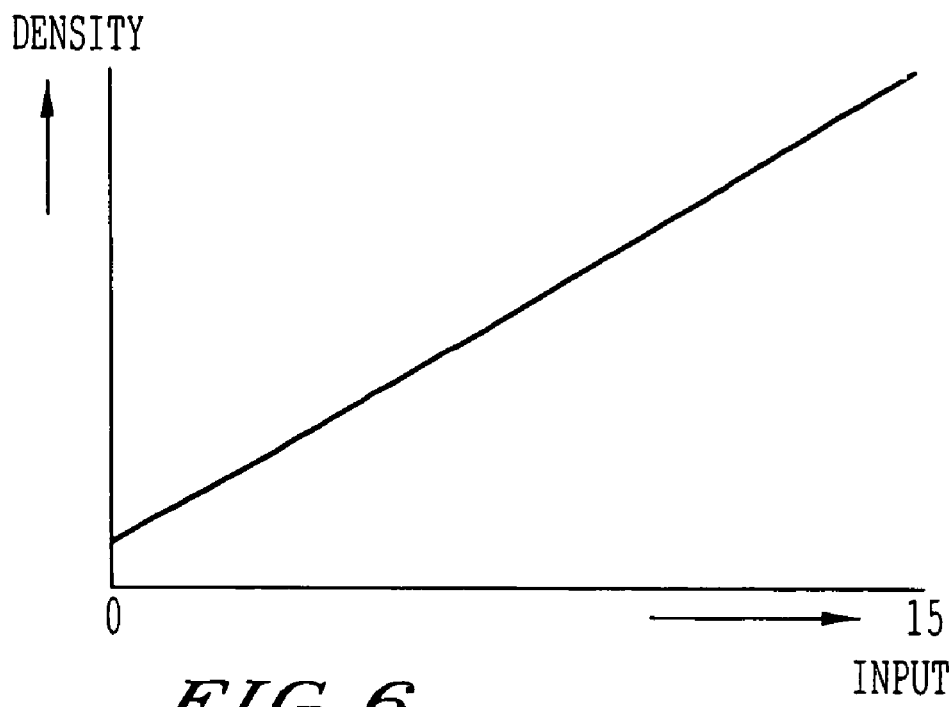
FIG. 6 is a graph showing a characteristic of conversion by the bit conversion table of FIG. 3.

The calculator A converts the 4-bit data (variable from 0 to 15) of these dots S0–S3, N0–N3, and x into 8-bit data (variable from 0 to 256) based on data contained in the bit conversion table 103 as shown in FIGS. 4 and 5. The bit conversion table 103 can reacts to sixteen different values from 0 to 15, for example, and converts an input value 6, for example, into an output value 92, for example, as shown in FIG. 5. FIG. 4 represents a curve plotted with the values of inputs in the horizontal direction and outputs in the vertical direction. This curve is predetermined in accordance with the characteristics of the printer used, such as the image forming apparatus 50, so that the bit conversion table 103 can linearly generate output density values relative to the input values, as shown in FIG. 6.

The calculator A handles the 8-bit data as data s0–s3, n0–n3, and x, and then calculates a data correction coefficient G based on this 8-bit data of s0–s3, n0–n3, and x, a gain Gs relative to the 8-bit data of s0–s3, and a gain Gn relative to the 8-bit data of n0–n3, using a formula;

$$G = Gn\Sigma(nt-x) + Gs\Sigma(st-x),$$

wherein n and s equal to one of 0, 1, 2, and 3, and t represents time. The thus-calculated data correction coefficient G is sent to the data correction table 104.

The calculator B is applied with the 4-bit data of the center dot x and the judgement data of the dot status judging unit 101. With the judgement data 0, or when the 4-bit data (variable from 0 to 15) of twelve dots including H0–H5, S0–S3, N1 and N3 are 0, the calculator B sends the 4-bit data having a predetermined value to the data correction table 104 and also sends a phase signal representing a mode 0 (a right mode) to the laser writing unit 5. But, when the judgement data is 1, the calculator B sends the 4-bit data having the value of the center dot x to the data correction table 104 and a phase signal representing a mode 1 (a left mode) to the laser writing unit 5.

Figure 7:
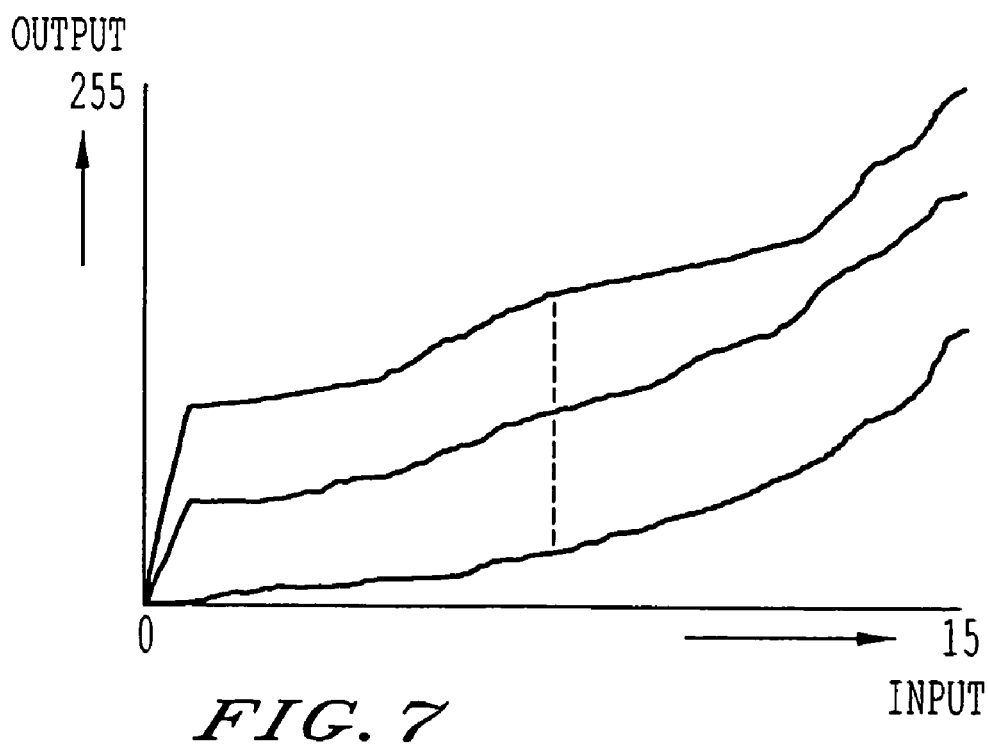
FIG. 7 is a graph for explaining a data corrector shown in FIG. 3.

The data correction table 104 prestores 256 different calculation results as conversion tables, as shown in FIG. 7, for converting the 4-bit data of the center dot x into 8-bit data. Based on the data correction coefficient G sent from the calculator A, the data correction table 104 selects among the 256 conversion tables the most suitable conversion table with which the density gray-scale becomes smooth and converts the 4-bit data of the center dot x into 8-bit data using the selected conversion table. In particular, a conversion table included in the data correction table 104 is selected when the values of the 4-bit data (variable from 0 to 15) of dots H0–H5, S0–S3, N1, and N3 are all 0. By using this conversion table, the density gray-scale based on a plurality of dots or a dot density or a dot size will be made smooth.

Figure 8:
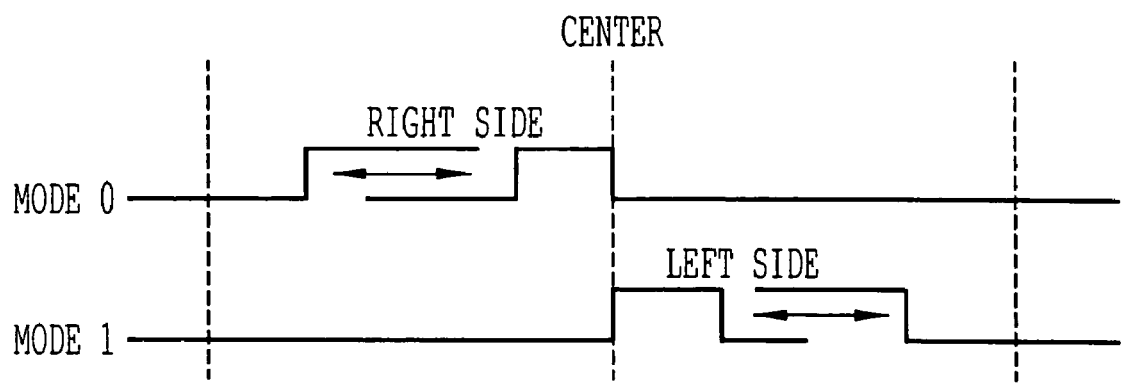
FIG. 8 is an illustration for explaining phases of dots formed during the image forming operation of the image forming apparatus of FIG. 1.

In the example being explained, the laser writing unit 5 normally writes a dot when the writing phase is in the mode 1 (left mode). In this case, the dot width grows towards right side from the dot center. On the other hand, the dot width grows towards left side from the dot center when the writing phase is in the mode 0 (right mode). This makes the left and right dots connected to each other, as illustrated in FIG. 8, and so a natural dot enhancement can be made.

Figure 9:
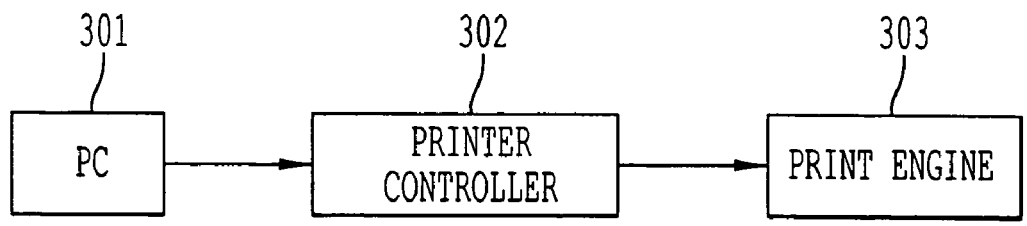
FIG. 9 is a block diagram for explaining an image forming system including a personal computer, a printer controller, and a print engine according to a second embodiment of the present invention.

Next, an image forming system 60 according to a second embodiment of the present invention is explained with reference to FIG. 9. FIG. 9 shows an exemplary image forming system 60 including a personal computer (PC) 301, a printer controller 302, and a print engine 303. In the image forming system 60, the printer controller 302 receives image information from the PC 301 in command forms such as a line command, a text command, for example. The printer controller 302 generates bit-map data in accordance with the received commands and sends the bit-map data, line by line, to the print engine 303. The print engine 303 then controls the laser diode (LD) to turn on and off or to modulate so as to form an actual image in accordance with the bit-map data sent from the printer controller 302.

Figure 10:
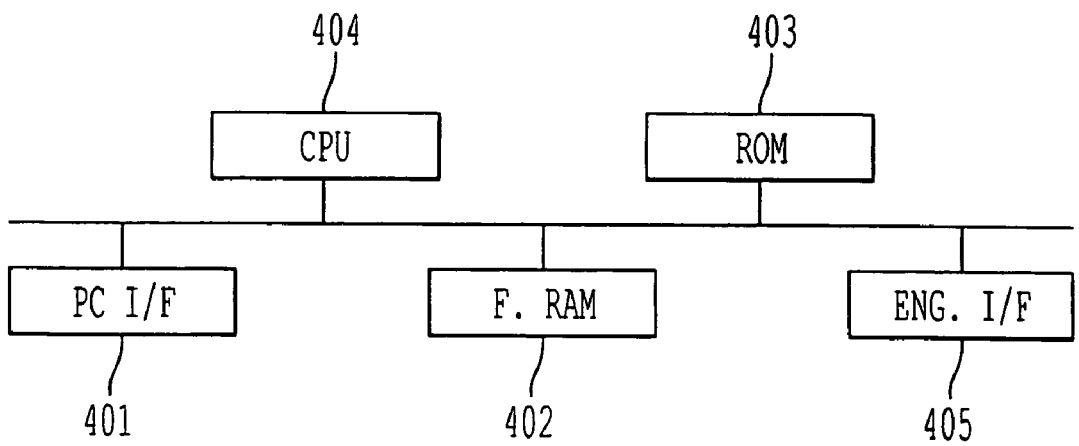
FIG. 10 is a block diagram of the printer controller shown in FIG. 9.

As shown in FIG. 10, an exemplary configuration of the printer controller 302 includes a PC (personal computer) interface 401, a frame RAM (random access memory) 402, a ROM (read only memory) 403, a CPU (central processing unit) 404, and an engine interface 405. The PC interface 401 receives the image commands from the PC 301. The frame RAM 402 stores the bit-map data which is generated in accordance with the image commands. The ROM 403 prestores threshold levels for dither and so on. The CPU 404 controls the entire operations of the printer controller 302. The engine interface 405 transfers the finalized data to the print engine 303.

Figure 11:
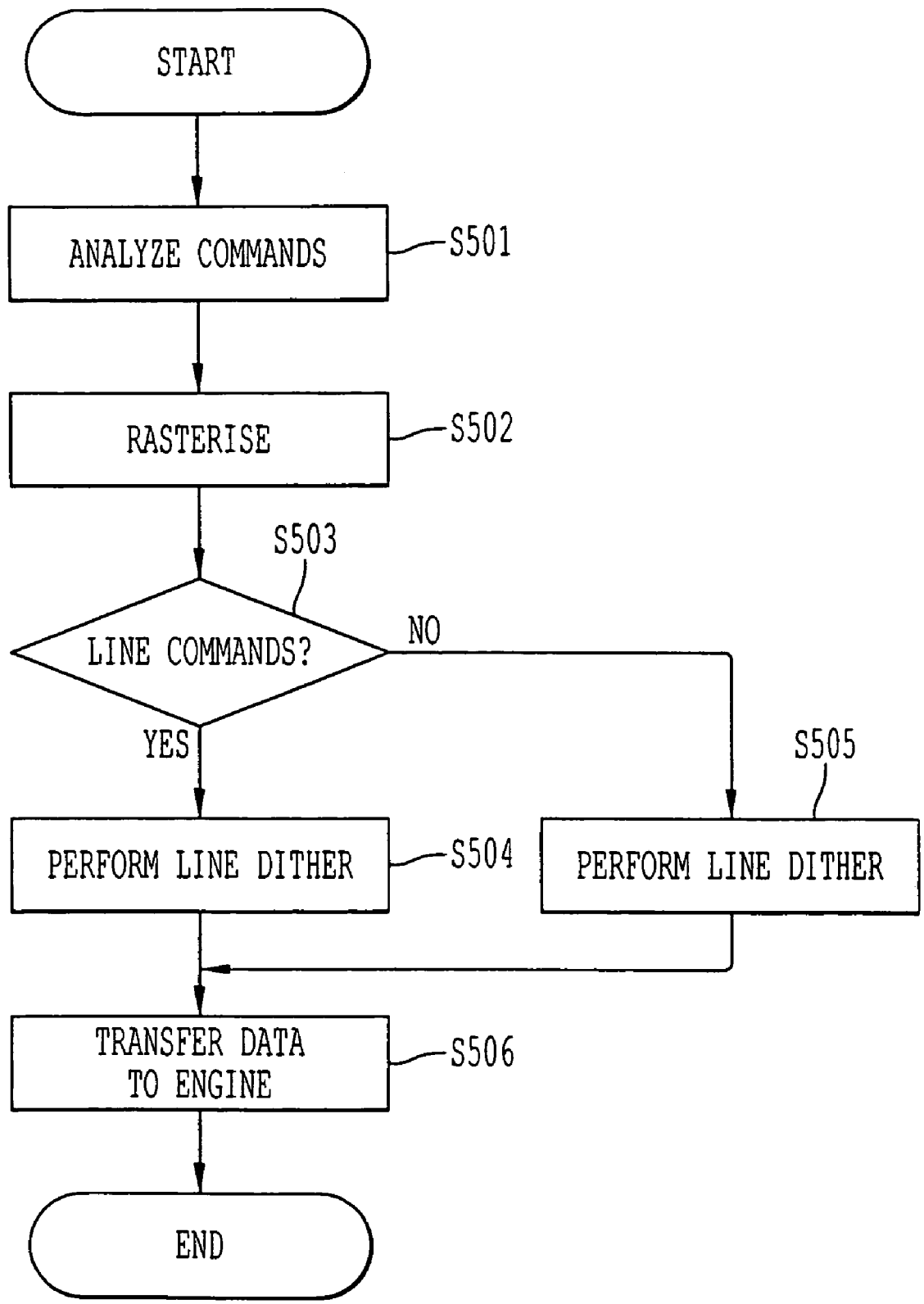
FIG. 11 is a flowchart of an exemplary operation performed by the printer controller shown in FIG. 9.

The thus-configured printer controller 302 performs a sequential operation as explained in FIG. 11. In Step S501 of FIG. 11, the CUP 404 analyzes the image commands sent from the PC 301. In Step S502, the CPU 404 rasterizes the image data in accordance with the received commands. Then, in Step S503, the CPU 404 checks if the received commands are line commands. If the received commands are the line commands, the CPU 404 performs a line dither in Step S504 and then sends the finalized image data to the print engine 303 in Step S506. But, if the received commands are not the line commands, the CPU 404 performs an image dither in Step S505 and then sends the finalized image data to the print engine 303.

FIGS. 12A–12C shows exemplary first, second, and third dither tables, respectively, for lines, and FIGS. 13A–13C shows exemplary first, second, and third dither tables, respectively, for images. The example being explained uses the line dither tables of FIGS. 12A–12C in performing Step S504 and the image dither tables of FIGS. 13A–13C in performing Step S505.

Since this example divides the gray-scale of the original image into 49 levels, one dot is formed by two bits and therefore three threshold levels can be used. More specifically, when the gray-scale is 0 all dots are set to 0. In the line dither process, all dots are set to the first threshold level when the gray-scale is 1 or 2. But, when the gray-scale is in the range from 3 to 25, only corresponding dots are set to the second threshold level, and when the gray-sale is in the range from 26 to 49, only corresponding dots are set to the third threshold level. Such a line dither process is referred to as a dispersive gray-scale process.

In the image dither process, a dot locating two dots right and two dots down from the top and left corner dot, for example, is set to the first threshold level when the gray scale is 1, to the second threshold level when the gray scale is 2, and to the third threshold level when the gray scale is 3, as shown in FIGS. 13A–13C. Another dot locating four dots right and four dots down from the top and left corner dot, for example, is set to the first level when the gray scale is 4, to the second level when the gray scale is 5, and to the third level when the gray scale is 6. Other dots in the matrix, of which gray scales are varied up to 48, are all set to the third level. Such an image dither process is referred to as an intensive gray-scale process.

Figure 14:
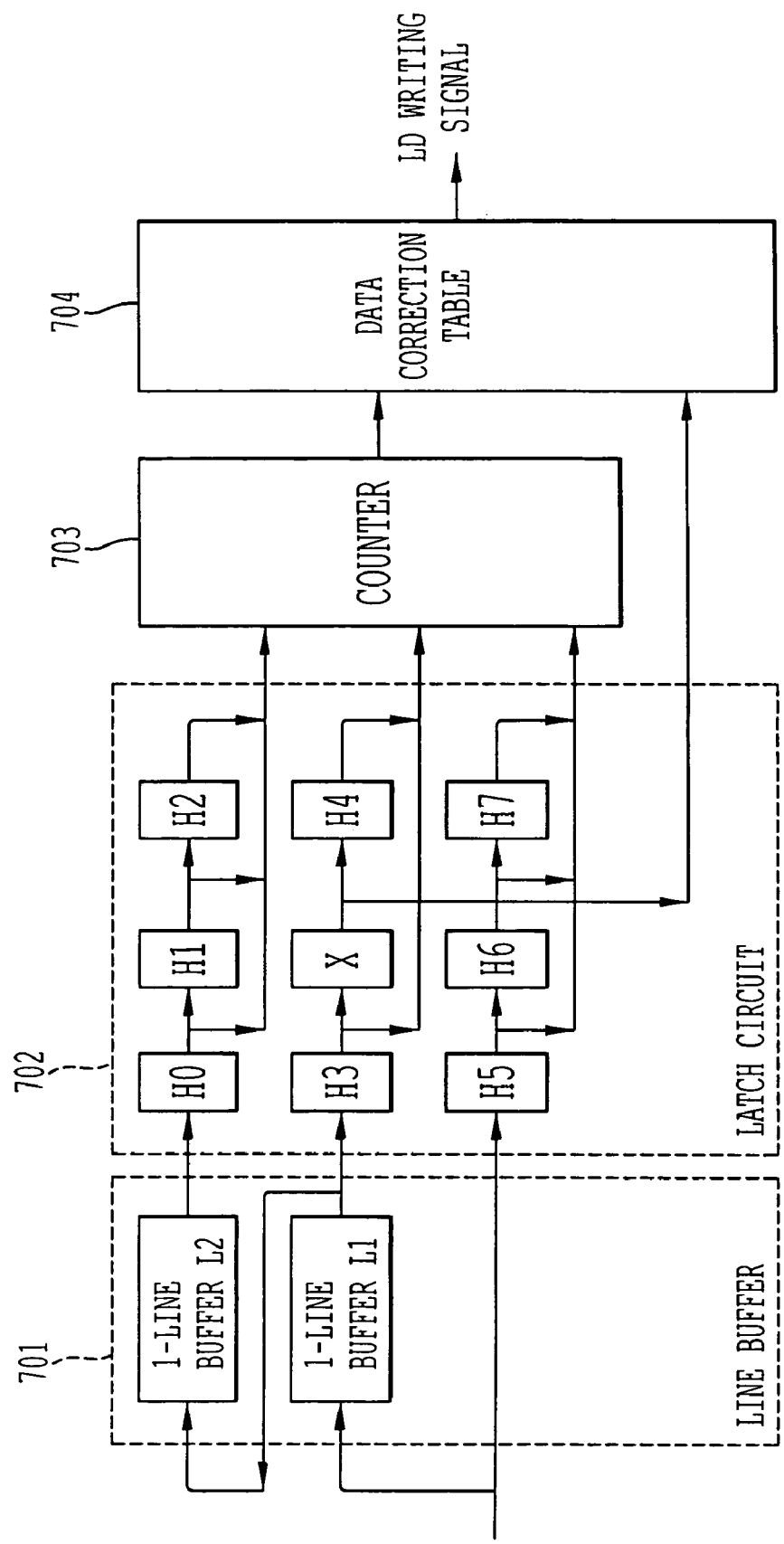
FIG. 14 is a block diagram of a main portion of the print engine shown in FIG. 9.

As shown in FIG. 14, the print engine 303 includes a line buffer 701, a latch circuit 702, a counter 703, and a data corrector 704. The line buffer 701 includes a first line buffer L1 and a second line buffer L2. The latch circuit 702 includes latches H0–H7 and a latch x corresponding to a focus dot. The counter 703 counts outputs data from the latches H0–H7. The data corrector 704 receives the data from the latch x and from the counter 703, and corrects for the data from the latch x and outputs an LD writing signal.

When the print engine 303 receives the 2-bit data from the printer controller 302, it latches the data at the H5 and the first line buffer L1 in synchronism with a timing signal (not shown). The data latched at the latch H5 is shifted to the latch H6 and the data latched at the line buffer L1 is shifted to and the latch H3 and to the line buffer L2, with another timing signal. As such, the data in the latches H0, H3, and H5 are shifted to the latches H1, x and H6, and the data in latches H1, x, and H6 are shifted to the latches H2, H4, and H7. The counter 703 receives values of dots H0–H7 other than the dot x and counts a number of existing dots. The data corrector 704 receives the number of dots from the counter 703 and the data of dot x from the latch x of the latch circuit 702, and converts the value of the dot x in accordance with data of a correction table as shown in FIG. 15. Then, the data corrector 704 outputs the converted data as the LD writing data in the 255 gray scale levels.

More specifically, by using the correction table of FIG. 15, the data corrector 704 converts the first, second, and third levels of the focus dot x into 85, 170, and 255, respectively, when the data representing the data range from 0 to 7 with respect to the dots H0–H7 sent from the counter 703, meaning that at least one place among the latches H0–H7 surrounding the dot x has no dot. In a similar manner, the data corrector 704 converts the first, second, and third levels of the focus dot x into 30, 80, and 255, respectively, when the data of dots H0–H0 sent from the counter 703 represents a value 8, meaning that all the places surrounding the dot x have dots.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. An image forming apparatus for making gray-scale images, said image forming apparatus comprising:
    a dot status detector configured to detect an occurrence in which a dot exists at a focus dot position and no dot exists at both positions immediately adjacent to the focus dot position in the main scanning direction; and
    a density adjuster configured to convert a writing level of the dot at the focus dot position to a first value when the dot status detector detects the occurrence and to convert the writing level of the dot at the focus dot position to a second value, different from the first value, when the dot status detector does not detect the occurrence.

2. The image forming apparatus as defined in claim 1, further comprising:
    a dot phase adjuster configured to expand the dot in a direction right of a center of the dot when the dot status detector detects the occurrence and configured to expand the dot in a direction left of the center of the dot when the dot status detector does not detect the occurrence.

3. An image forming apparatus for making gray-scale images, said image forming apparatus comprising:
    dot status detecting means for detecting an occurrence in which a dot exists at a focus dot position and no dot exists at both positions immediately adjacent the focus dot position in the main scanning direction; and
    density adjusting means for converting a writing level of the dot at the focus dot position to a first value when the dot status detecting means detects the occurrence and for converting the writing level of the dot at the focus dot position to a second value, different from the first value, when the dot status detecting means does not detect the occurrence.

4. The image forming apparatus as defined in claim 3, further comprising:
    dot phase adjusting means for expanding the dot in a direction right of a center of the dot when the dot status detecting means detects the occurrence and for expanding the dot in a direction left of the center of dot when the dot status detecting means does not detect the occurrence.

5. A method for forming gray-scale images, said method comprising:
    detecting whether an occurrence exists in which a dot exists at a focus dot position and no dot exists at both positions immediately adjacent the focus dot position in the main scanning direction; and
    converting a writing level of the dot at the focus dot position to make a smooth gray-scale transition to a first level when the detecting step detects the occurrence; and
    converting the writing level of the dot at the focus dot position to a second value different from the first value, when the detecting step does not detect the occurrence.

6. The method as defined in claim 5, further comprising the step of:
    expanding the dot in a direction right of a center of the dot when the detecting step detects the occurrence, and expanding the dot in a direction left of the center of the dot when the detecting step does not detect the occurrence.

* * * * *